United States Patent
McMurtrey et al.

(10) Patent No.: US 7,287,541 B2
(45) Date of Patent: Oct. 30, 2007

(54) METHOD, APPARATUS AND SYSTEM FOR CONTROLLING FLUID FLOW

(75) Inventors: Ryan D. McMurtrey, Idaho Falls, ID (US); Daniel M. Ginosar, Idaho Falls, ID (US); Joesph V. Burch, Shelley, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 259 days.

(21) Appl. No.: 10/760,015

(22) Filed: Jan. 16, 2004

(65) Prior Publication Data
US 2005/0155650 A1 Jul. 21, 2005

(51) Int. Cl.
*G05D 7/06* (2006.01)
*F16K 31/54* (2006.01)

(52) U.S. Cl. .................. 137/14; 137/331; 137/486; 137/487.5; 251/215; 251/250

(58) Field of Classification Search ............. 137/331, 137/486, 487.5, 554; 251/229, 249.5, 250, 251/215, 225, 129.12, 248, 250.5, 129.11
See application file for complete search history.

(56) References Cited

U.S. PATENT DOCUMENTS

| | | | | |
|---|---|---|---|---|
| 429,658 A * | 6/1890 | Stanford | ............ | 239/458 |
| 802,946 A * | 10/1905 | Waterman | ............ | 137/637 |
| 2,520,430 A * | 8/1950 | Henry | ............ | 137/331 |
| 3,168,901 A * | 2/1965 | Murakami | ............ | 137/492 |
| 3,488,030 A * | 1/1970 | Hulme et al. | | |
| 3,505,888 A * | 4/1970 | Denkowski | ............ | 74/89.27 |
| 3,605,794 A * | 9/1971 | Hajime Seo et al. | ....... | 137/331 |
| 4,114,469 A * | 9/1978 | Stratienko | ............ | 74/89.38 |
| 4,346,728 A * | 8/1982 | Sulzer | ............ | 137/243.6 |
| 4,465,091 A | 8/1984 | Keller | | |
| 4,465,901 A * | 8/1984 | Best | ............ | 713/190 |
| 4,499,920 A * | 2/1985 | Steffan et al. | ....... | 137/624.15 |
| 4,735,101 A * | 4/1988 | Charbonneau et al. | . | 73/862.193 |
| 4,759,386 A * | 7/1988 | Grouw, III | ............ | 137/554 |
| 4,789,132 A | 12/1988 | Fujita et al. | | |
| 5,024,417 A | 6/1991 | Voxbrunner | | |
| 5,129,418 A * | 7/1992 | Shimomura et al. | ....... | 137/486 |
| 5,146,126 A | 9/1992 | Hutchins | | |

(Continued)

FOREIGN PATENT DOCUMENTS

JP 07012689 * 1/1995

(Continued)

*Primary Examiner*—Ramesh Krishnamurthy
(74) *Attorney, Agent, or Firm*—TraskBritt, P.C.

(57) ABSTRACT

A system, apparatus and method of controlling the flow of a fluid are provided. In accordance with one embodiment of the present invention, a flow control device includes a valve having a flow path defined therethrough and a valve seat in communication with the flow path with a valve stem disposed in the valve seat. The valve stem and valve seat are cooperatively configured to cause mutual relative linear displacement thereof in response to rotation of the valve stem. A gear member is coupled with the rotary stem and a linear positioning member includes a portion which complementarily engages the gear member. Upon displacement of the linear positioning member along a first axis, the gear member and rotary valve stem are rotated about a second axis and the valve stem and valve seat are mutually linearly displaced to alter the flow of fluid through the valve.

50 Claims, 4 Drawing Sheets

U.S. PATENT DOCUMENTS

| | | | |
|---|---|---|---|
| 5,152,316 A * | 10/1992 | Dorr | 137/487.5 |
| 5,823,104 A * | 10/1998 | Beisel et al. | 100/48 |
| 5,931,142 A | 8/1999 | Gerling | |
| 6,003,535 A | 12/1999 | Ollivier | |
| 6,579,821 B1 | 6/2003 | Ginosar et al. | |
| 6,584,867 B2 * | 7/2003 | Kennedy | 74/89.17 |
| 6,712,085 B2 * | 3/2004 | Weissgerber et al. | 137/12 |
| 6,887,283 B1 | 5/2005 | Ginosar et al. | |
| 2003/0116195 A1 | 6/2003 | Weissgerber et al. | |

FOREIGN PATENT DOCUMENTS

| | | | |
|---|---|---|---|
| JP | 2003208229 | * | 7/2003 |
| JP | 2003307280 | * | 10/2003 |

* cited by examiner

METHOD, APPARATUS AND SYSTEM FOR CONTROLLING FLUID FLOW

STATEMENT OF GOVERNMENT RIGHTS

The present invention was made with United States Government support under Department of Energy Contract No. DE-AC07-99ID13727. The Federal Government has certain rights in this invention.

BACKGROUND OF THE INVENTION

1. Field of the Invention

The present invention relates generally to fluid flow control and, more particularly, to high resolution flow control of, for example, high pressure compressible fluids including supercritical fluids.

2. State of the Art

Control of fluid flow is important in numerous applications. For example, fluid flow control is involved in hydraulic applications, in the operation of various semiconductor fabrication systems such as chemical vapor deposition (CVD) and atomic layer deposition (ALD) equipment, in the operation of autoclaves and similar equipment, and in the performance of various laboratory experiments.

In all of the above-listed applications, as well as numerous others, the ability to control fluid flow, whether according to pressure or flow rate (either mass or volume), is important to the success of the operation or process being performed. For example, in regard to various laboratory experiments, fluid flow control often needs to be precise and repeatable so as to ensure that certain input conditions are actually what was intended and the integrity of the experiment's outcome is not in question. It becomes even more important to control the fluid flow, and also more difficult to accurately do so, when the fluid being handled is supercritical and there is a potential of effecting a phase change within the fluid as it flows through a flow control device. While various fluid control devices have been designed in an attempt to provide high resolution flow control, such devices have been lacking in their ability to consistently provide accurate control of fluids including high pressure, compressible fluids.

Figure 1:
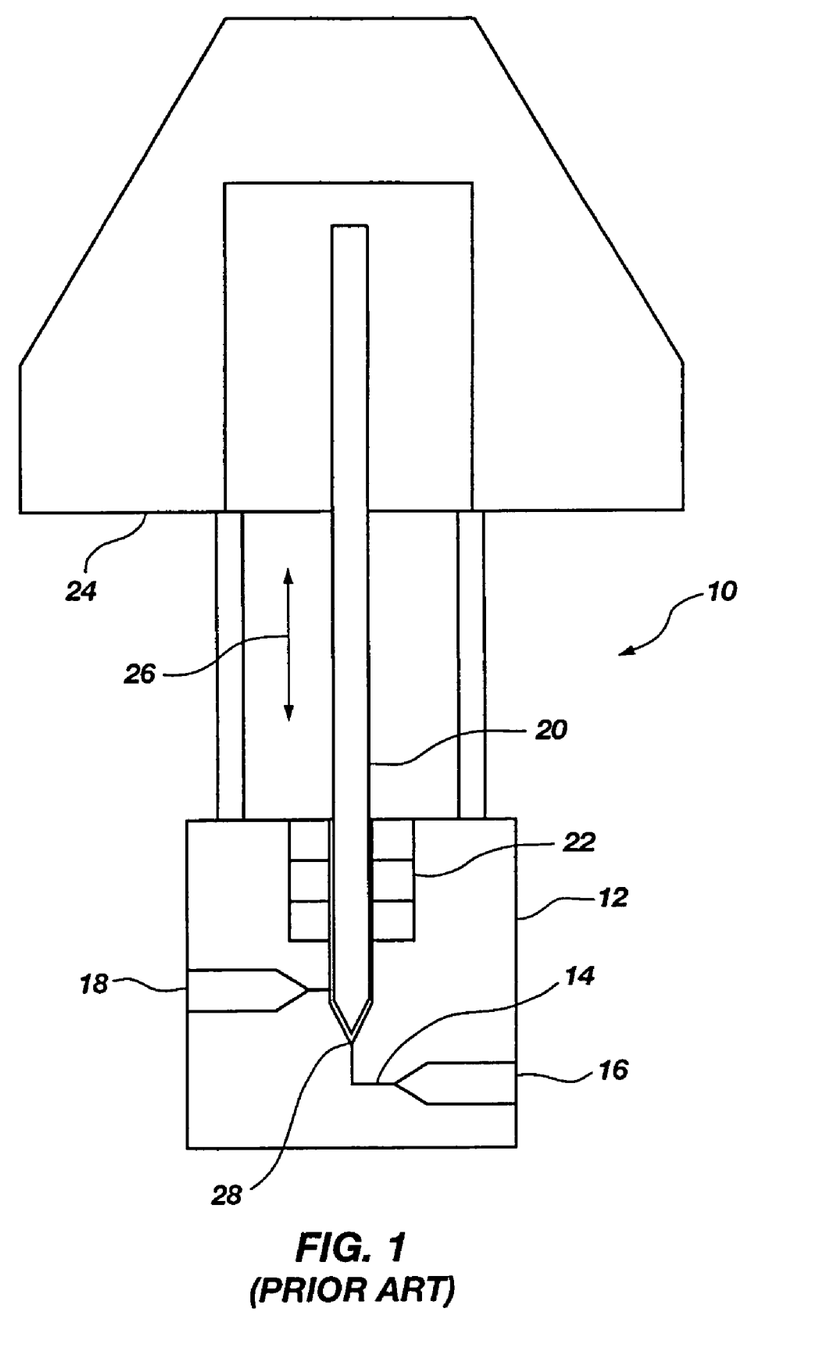
FIG. 1 shows a prior art fluid flow control device.

For example, referring to FIG. 1, a prior art flow control device 10 is shown. The flow control device 10 includes a valve 12 with a flow path 14 defined therethrough. The valve includes an inlet 16 configured to be coupled with a fluid source (not shown) and an outlet 18 configured to be coupled with a conduit or some other device to which fluid is to be delivered (none shown). A linearly positionable valve stem 20 is disposed within the valve and configured to control the flow of fluid passing through the defined flow path 14. Packing 22 or some other seal arrangement may be disposed about a portion of the valve stem 20 to prevent leaking of the fluid around the valve stem 20. The valve stem 20 is coupled with a linear positioning actuator 24 which displaces the valve stem along a linear path as indicated by directional arrow 26.

While the flow control device 10 may provide adequate fluid flow control for some applications, it is desirable to improve on such an arrangement. For example, a flow control device configured substantially as described with respect to FIG. 1 may exhibit a flow coefficient of approximately 0.03 $C_v$, wherein $C_v$ may be defined, as it relates to valves, as a quantity relating a flow rate, in gallons per minute (gpm), of a fluid with a known specific gravity to the pressure drop experience across the valve as measured in pounds per square inch (psi). It may be noted that the flow coefficient is not dimensionally homogenous (as illustrated in the following equations) and is specifically limited to English units.

For incompressible fluids the flow coefficient $C_v$ may be expressed by the following equation:

$$C_v = \frac{Q}{\sqrt{\frac{\Delta p}{SG}}}$$

Wherein Q is the flow rate in gallons per minute, $\Delta p$ is the change in pressure across the valve in pounds per square inch, and SG is the specific gravity of the fluid flowing through the valve.

For compressible fluids, the determination of the flow coefficient becomes more complex. For example, if the inlet pressure is twice that of the outlet pressure (what may be termed as critical flow) or greater, the flow coefficient may be expressed by the following equation:

$$C_v = Q_G \frac{\sqrt{SG \times T}}{816 \times P_{inlet}}$$

If the inlet pressure is less than twice the outlet pressure (what may be termed subcritical flow) the flow coefficient may be expressed by the following equation:

$$C_v = \frac{Q_G}{962} \sqrt{\frac{SG \times T}{P_{inlet}^2 - P_{outlet}^2}}$$

Wherein $Q_G$ is the flow rate of the fluid in standard cubic feet per minute (scfm), T is the absolute temperature in degrees Rankin, $P_{inlet}$ and $P_{outlet}$ are the inlet and outlet pressures of the valve, respectively, in pounds per square inch absolute (psia), and SG is the specific gravity of the fluid flowing through the valve.

Returning to the prior art flow control device 10 described with respect to FIG. 1, while in absolute terms, a flow coefficient of 0.03 $C_v$ would appear to provide fluid control at what might be consider a "high" resolution, such a flow coefficient may not be considered adequate for a number of applications including. For example, in some applications, such as various laboratory experiments, it may be desired to provide flow control with a resolution which is approximately an order of magnitude finer than such a prior art flow control device. Additionally, such a flow control device 10 has, in the past, only provided adequate pressure control of a fluid within, for example, 50 to 100 psi in some cases. It is desirable to obtain more exact pressure control of the fluid for numerous applications.

An additional problem with the flow control device 10 shown and described with respect to FIG. 1 is that the linear motion of the valve stem 20 makes the valve 12 vulnerable to contamination from grit or small particulates which may be present in the fluid flowing therethrough. For example, in the past, such a valve 12 has had small particulates become lodged or wedged between the valve stem 20 and the valve stem seat 28. When lodged between the valve stem 20 and valve stem seat 28, the particulates have interfered with the actuation of the valve stem 20 and the precise positioning thereof. Furthermore, the presence of particulates between the valve stem 20 and the valve stem seat 28 has, in the past, resulted in the galling of the two components thereby causing the valve 12, initially, to operate imprecisely and, ultimately, to fail. In some particular cases, the valve 12 associated with a flow control device such as described with respect to FIG. 1 has failed within approximately fifteen to twenty minutes of use because of the presence of such particulates in the fluid.

In view of the shortcomings in the art, it would be advantageous to provide a method and apparatus for consistently and repeatedly controlling the flow of high pressure, compressible fluids at a relatively high resolution. It would further be desirable to provide a method and apparatus of controlling fluid flow which is not susceptible to fouling or galling due to the presence of particulates within a fluid being processed thereby.

BRIEF SUMMARY OF THE INVENTION

In accordance with one aspect of the invention, a fluid flow control device is provided. The fluid flow control device includes a valve having a fluid inlet, a fluid outlet and a flow path defined therebetween. The valve further includes a valve stem disposed within a valve seat in communication with the flow path. A gear member is coupled to the valve stem, which is cooperatively configured with the valve seat to cause the valve stem to advance or back off within the valve seat responsive to rotation of the valve stem about a first axis. A linear positioning member is disposed adjacent the gear member wherein at least a portion of the linear positioning member is configured to complementarily engage the gear member. The linear positioning member is configured to be displaced along a second axis to cause rotation of the gear member and valve stem about the first axis and the attendant displacement of the valve stem along the first axis. In one embodiment, the portion of the linear positioning member which complementarily engages the gear member may be configured as substantially helically cut worm gear.

In accordance with another aspect of the present invention, a fluid flow control system is provided. The fluid flow control system includes a controller and at least one fluid flow control device operably coupled with the controller. The fluid flow control device includes a valve having a fluid inlet, a fluid outlet and a flow path defined therebetween. The valve further includes a valve stem disposed within a valve seat in communication with the flow path. A gear member is coupled to the valve stem, which is cooperatively configured with the valve seat to cause the valve stem to advance or back off within the valve seat responsive to rotation of the valve stem about a first axis. A linear positioning member is disposed adjacent the gear member wherein at least a portion of the linear positioning member is configured to complementarily engage the gear member. The linear positioning member is configured to be displaced along a second axis to cause rotation of the gear member and valve stem about the first axis and the attendant displacement of the valve stem along the first axis.

In accordance with yet another embodiment of the present invention, a method of controlling the flow of a fluid is provided. The method includes providing a valve having a flow path defined therethrough. A valve stem is disposed within a valve seat in communication with the flow path and is coupled with a gear member. The gear member is engaged with a complementary surface of a linear positioning member and the fluid is passed through the flow path. The linear positioning member is displaced along a first axis to rotate the gear member and valve stem about a second axis and displace the valve stem along the second axis.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 2:
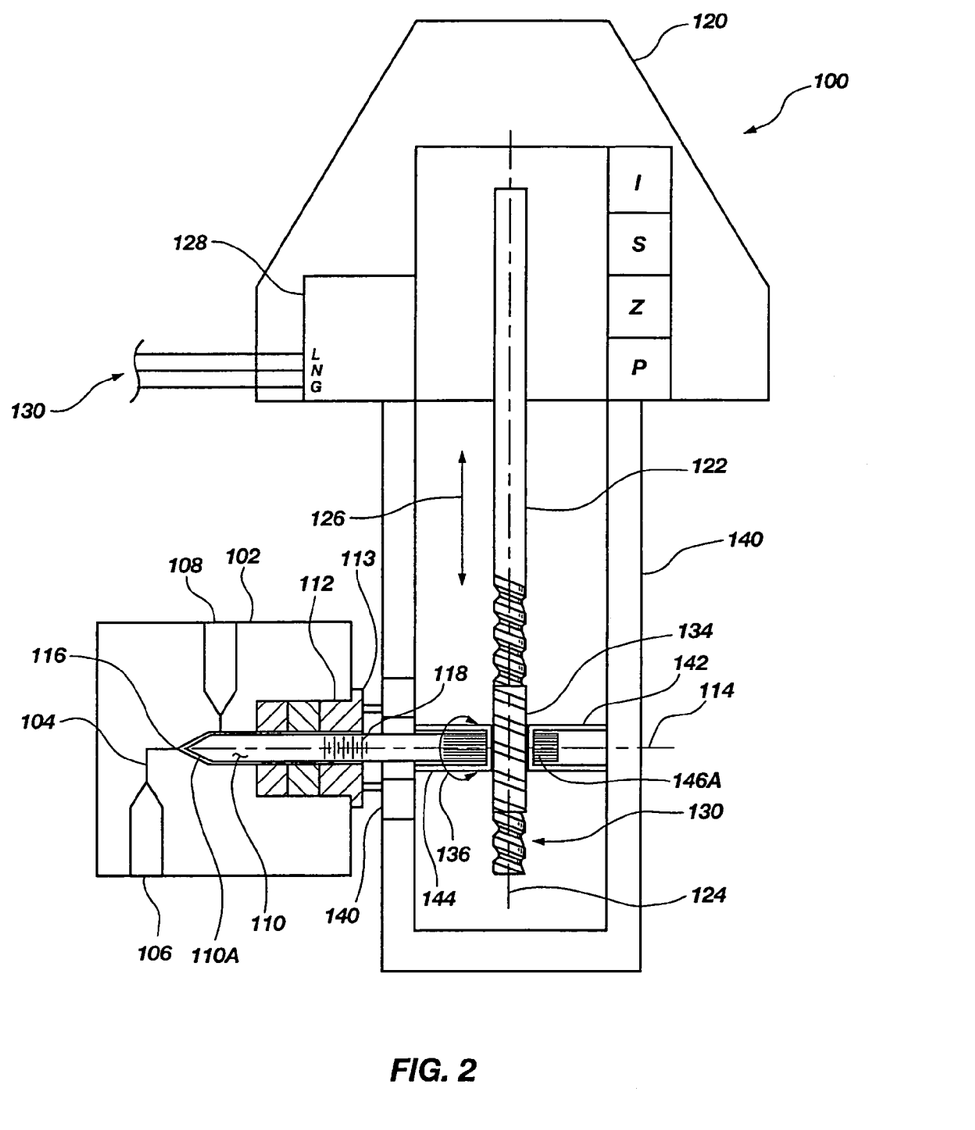
FIG. 2 shows a fluid flow control device in accordance with an embodiment of the present invention.

Referring to FIG. 2, a fluid flow control device 100 is shown. The flow control device includes a valve 102 with a flow path 104 defined therethrough. The valve 102 includes an inlet 106 configured to be coupled with a fluid source (not shown in FIG. 2) and an outlet 108 configured to be coupled with a conduit or some other device to which fluid is to be delivered. A valve stem 110 is disposed within the valve 102 and configured to control the flow of fluid passing through the defined flow path 104. Packing 112 or some other seal assembly may be disposed about a portion of the valve stem 110 to prevent leaking of the fluid around the valve stem 110.

The valve stem 110 is configured and oriented to be displaced within the valve along a defined axis 114 relative to an associated valve seat 116 upon the rotation of the valve stem 110 about the defined axis 114. Thus, the valve stem 110 and a component of the valve 100, such as the packing gland 113 or some other appropriate structure, may include mating or complimentarily engaged threads 118 to enable the displacement of the valve stem 110 relative to the valve 100 along the axis 114 in response to the rotation of the valve stem 110. The pitch of the threads 118 may be selected to control the magnitude of displacement of the valve stem 110 relative to the valve 100 upon rotation of the valve stem 110. An exemplary valve may include Micro Metering valve Part # 10VRMM2812 commercially available from Autoclave Engineers of Eerie Pa., although other valves may be used in practicing the present invention.

A linear positioning actuator 120 is coupled with a positioning member 122 such as a shaft or other structural member. The actuator 120 may include, for example, a high resolution linear positioning stepper motor configured to displace the positioning member 122 along an axis 124 as indicated by directional arrow 126. An exemplary actuator may include a model EVA-1 electronic valve actuator commercially available from Badger Meter, Inc., of Tulsa, Okla. Such an actuator 120 may include a transformer 128 coupled to a 120 VAC power supply 130 which is configured to provide DC power to the actuator 120. Another exemplary actuator might include a pneumatic actuator which utilizes a current to pressure (I/P) converter for controlling the linear position of the positioning member 122. It is noted, however, that other actuators 120 may be used in conjunction with the present invention.

A portion of the positioning member 122, such as at the distal end 132 thereof, is configured to matingly engage a gear 134. The gear 134 is coupled with the valve stem 110 and configured to rotate the valve stem 110. As shown, the gear 134 is disposed about valve stem 110 in perpendicular orientation thereto. Thus, as the positioning member 122 is displaced linearly along axis 124, the portion of the positioning member 122 engaged with the gear 134 causes rotation of the gear 134 about axis 114 as indicated by directional arrow 136, advancing or backing off the valve stem 110 within the valve seat 116, depending upon the direction of displacement of positioning member 122. The diameter of the gear 134 may be selected to provide a desired gear reduction and thereby improve the resolution provided by the linear actuator 120. As will be appreciated by those of ordinary skill in the art, a larger diameter gear 134 will provide a greater amount of reduction such that a larger linear displacement of the positioning member 122 will be required to effect a full turn of the valve stem 110.

In one embodiment, the distal end 130 of the positioning member 122 may be configured as a toothed rack and the gear 134 may be configured as a mating pinion gear thereby providing a rack and pinion assembly. However, in another embodiment, as specifically shown in FIG. 3, (while also still referring to FIG. 2) the distal end 130 of the positioning member 122 may be configured as a substantially helically cut worm gear 138 wherein gear 134 is configured to mate therewith. With conventional worm gear arrangements, the worm gear 138 acts as a driving gear by rotating about its axis 124 and driving or rotating the associated driven gear 134. However, the worm gear 138 of the present invention is not configured to rotate about its axis 124 but, rather, remains rotationally fixed and is linearly displaced along its axis 124 by the actuator 120.

Figure 3:
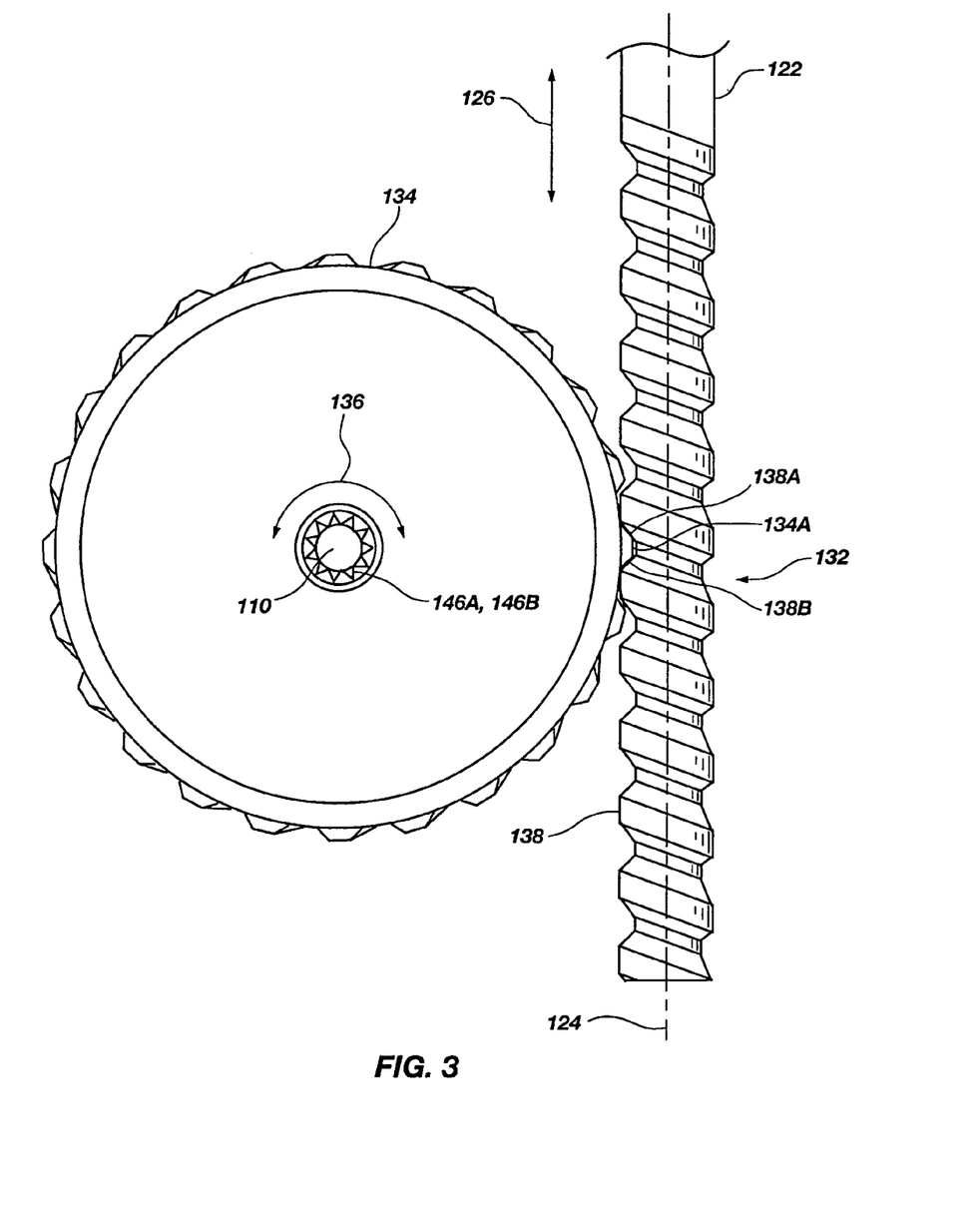
FIG. 3 shows an enlarged view of a portion of the device of FIG. 2.

It has been determined that the use of a worm gear 138 with a mating gear 134, wherein the worm gear 138 is rotationally fixed but linearly displaced, provides a configuration which may be designed with a minimum of backlash between intermeshed gear teeth (e.g., teeth 134A, 138A and 138B). The minimization of backlash between the gear 134 and worm gear 138 enables more precise rotational control of the valve stem 110. For example, if backlash exists between the gear 134 and complementarily engaging portion of the linear positioning member 120, there will be a small displacement of the positioning member 122, as the positioning member 122 reverses directions, which does not result in the rotation of the associated gear 134 and valve stem 110 coupled therewith. While the gear 134 and worm gear 138 may be formed from any of a number of suitable materials, in one exemplary embodiment the gear 134 is formed of a brass material while the worm gear 138 is formed of a carbon steel material.

Referring back more particularly to FIG. 2, a frame member 140 may be used to couple the valve stem 110 and the actuator 120 to one another such that the valve stem 110, with its associated gear 134, may remain in a relatively fixed geometric position with respect to the positioning member 122. In other words, the frame member 140 serves to maintain the geometrical relationship of the two axes 114 and 124. Additionally, in one embodiment, other frame or guide members 142 and 144 may be used to maintain the alignment of the gear 134 with the positioning member 122. For example, the gear 134 may be slidably coupled with the valve stem 110, such as with mating splines 146A (see also 146B in FIG. 3), such that the gear 134 may transfer rotational motion to the drive stem 110 while enabling the gear 134 to maintain alignment with the positioning member 122 along its axis 124 during displacement of the valve stem 110 along the defined axis 114. Of course other arrangements may be utilized to accomplish such a slidable coupling between the gear 134 and drive stem 110. It is also noted that in some circumstances, such as wherein expected rotation of the gear 134 and the resulting displacement of the valve stem 110 along the defined axis 114 is small, any misalignment between the gear 134 and drive stem 110 may be negligible. In such a circumstance, a coupling which enables the displacement of the gear 134 relative to the drive stem 110 along the axis 114 would not be necessary.

The flow control device 120 of the present invention is configured to provide relatively high resolution fluid flow control for high pressure, compressible fluids. For example such a configuration may have an associated flow coefficient, $C_v$ (as defined above herein), of approximately 0.004. Additionally, the flow control device may operate at pressures of up to 3,000 psi gauge (psig) while controlling the pressure of the fluid flow within approximately 3 psi. Fluid flow can be regulated to less than approximately 1 milliliter per minute (mL/min). Furthermore, such a flow control device 100 is capable of similarly controlling the flow of supercritical fluids, wherein the fluid changes phases due to a pressure drop across the valve 102.

Such high resolution of fluid flow control is largely a result of the precise control of the tip 110A of the valve stem 110 relative to the valve seat 116. As set forth above, the movement of the linear positioning member 122 turns the gear 134 which, in turn, causes rotation of the valve stem 110 relative to the body of the valve 102. As the valve stem 110 turns, the mating threads 118 enable a linear movement of the valve stem tip 110A relative to the valve seat 116. The relatively small changes in rotational motion of the valve stem 110 result in even more minute changes in the linear position of the valve stem 110 and associated tip 110A along defined the axis 114. These precise, minute changes in linear position of the valve stem tip 110A relative to the valve seat 116 enable precise changes in a pressure drop experienced across the valve 102. Thus, the precision of the linear actuator 120 is enhanced through the implementation of the gear 134 and worm gear 138 as well as the rotary-type valve stem 110.

It is noted that the rotary-type valve stem 110 not only provides enhanced resolution of the fluid flow control, but also inhibits the lodging of particulates between the valve stem 110 and the valve seat 116 and the attendant galling that may result therefrom. For example, considering the prior art valve 12 shown in FIG. 1, such a linearly positionable valve stem 20 requires relatively tight machining tolerances for proper operation and control of fluid flow. However, because the valve 102 of the present invention utilizes a rotary-type valve stem 110, broader or, relatively gross tolerances may be used with respect to the fit of the valve stem 110 and the valve seat 116 while still accomplishing a flow coefficient ($C_v$) which is similar to that of the prior art valve 12 described with respect to FIG. 1.

Furthermore, when using a valve 12 configured as described with respect to FIG. 1, the close tolerances of the valve stem 20 with respect to the valve seat 28 cause the valve 12 to become prone to galling, particularly when solids are present in the fluid flow. Additionally, in situations where a substantial pressure drop and accompanying phase change occur across the valve 12, heat is often applied to the fluid flow to prevent flash freezing of the fluid flow, which may lead to deposition and accumulation of solids within the valve 12 (or other portions of the fluid flow path), so as to prevent the plugging of the valve 12. However, the addition of heat may also result in thermal expansion of various components including, for example, the body of the valve 12, the valve stem 20 and valve seat 28. Because tolerances between such components are already tight, any thermal expansion exhibited by these components is likely to result in increased friction therebetween. This results in an even greater likelihood of galling and failure of the valve 12.

The use of a rotary-type valve 102 of the present invention is less prone to galling when fluid flow is heated because of the relatively gross tolerances between the valve stem 110 and mating components. Furthermore, if a particulate does become lodged between the valve stem 110 and the valve seat 116, it has been determined that rotation of the valve stem to an open position, followed by reverse rotation of the valve stem 110 to a closed or reduced flow position, allows the particulate to be washed through the valve 102 and continued operation of the flow control device 100 may continue. Thus, the flow control device 100 of the present invention may require less filtering of a given fluid.

Still referring to the FIG. 2, in many applications it may be desirable to utilize an actuator 120 which is configured to enable automatic control of the flow control device 100. Thus, for example, the actuator 120 may include a control signal input I such as a 4–20 milliamp (mA) analog input from an associate controller (not shown in FIG. 2). Furthermore, the actuator 120 may include span adjustment S and a zero adjustment Z to set limit of travel and the zero position of the positioning member 122 respectively. Additionally, a linear potentiometer P or other linear position sensor may be utilized to determine the position of the positioning member 122, within its limits of travel, at any given time.

Figure 4:
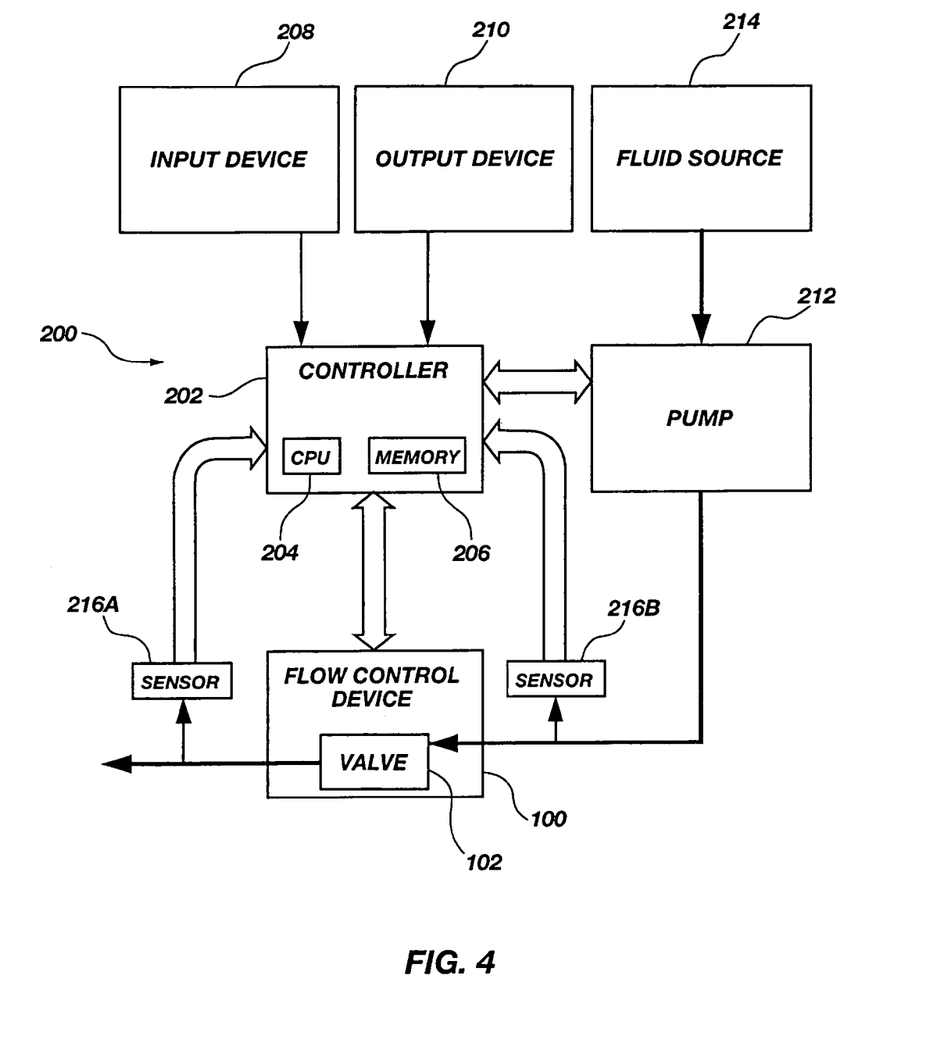
FIG. 4 is a schematic of a fluid flow control system in accordance with an embodiment of the present invention.

Referring now to FIG. 4, a fluid flow control system 200 may include a flow control device 100 coupled with a controller 202. The controller may include, for example, a PID (proportional, integral, derivative) controller or, it may include a computer having a central processing unit (CPU) 204, or other microprocessor, and memory 206. The controller 202 may be coupled to an input device 208 and an output device 210 such that, for example, commands or instructions may be provided to the controller 202 and so that actions taken or conditions monitored by the controller may be displayed or reported. The controller 202 may also be coupled with a pump 212 or other device configured to provide fluid flow from a fluid source 214 at a specified pressure and/or flow rate. An exemplary pump may include a high-pressure syringe pump commercially available from, for example, ISCO, Inc., of Lincoln, Nebr.

One or more sensors 216A and 216B may be utilized to monitor one or more characteristics of the fluid flow. For example, the sensors 216A and 216B may include pressure transducers to monitor the pressure of the fluid flow at a desired location, or to determine the pressure drop experienced by the fluid as it flows through the valve 102. In another embodiment, one or more of the sensors 216A and 216B may be configured to determine the flow rate of the fluid. Additionally, one or more of the sensors 216A and 216B may be configured to detect the temperature of the fluid flow at a given location along the flow path. It will be noted that the sensors 216A and 216B may be configured to determine other parameters or characteristics of the fluid flow and that multiple sensors may be employed to determine a combination of the above-listed parameters. As shown in FIG. 4, the sensors 216A and 216B may be located and configured to detect a characteristic of the fluid flow at a location upstream from the valve 102 (e.g., sensor 216B) or downstream from the valve 102 (e.g., sensor 216A) or both.

In operation, the controller 202 may provide a signal to the pump 212 to provide fluid flow from the fluid source 214. One or more of the sensors 216A and 216B may detect a specified parameter of the fluid flow. If the value of the detected parameter of the fluid flow differs from a desired value, the controller 202 may actuate the flow control device 100 to alter the setting of the valve and, thereby, alter one or more characteristics of the fluid flow in order to obtain the desired value of the parameter being monitored.

As noted above, the present invention may be practiced in a variety of environments and in conjunction with numerous applications. For example, various laboratory experiments will benefit from the high level of fluid flow control achieved with the present invention. Other exemplary applications include, for example: extraction of carbon dioxide from soils; catalyst regeneration processes including an exemplary process set forth in U.S. Pat. No. 6,579,821 for METHOD FOR REACTIVATING SOLID CATALYSTS USED IN ALKYLATION REACTIONS, issued Jun. 17, 2003, the disclosure of which is incorporated, in its entirety, by reference herein; as well as a process set forth in copending U.S. patent application Ser. No. 09/554,708 for A PROCESS FOR THE REACTIONS OF GLYCERIDES AND FATTY ACIDS IN A CRITICAL FLUID MEDIUM, filed Jul. 31, 2000, the disclosure of which is incorporated, in its entirety, by reference herein. Of course, as stated above, such applications are exemplary only and, as will be appreciated by those of ordinary skill in the art, the present invention is useful in numerous other applications and processes.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A fluid flow control device comprising:
a valve having a fluid inlet, a fluid outlet and a flow path defined therebetween, the valve further including a valve seat in communication with the flow path and a valve stem disposed within the valve seat and cooperatively configured with the valve seat to cause the valve stem to advance or back off within the valve seat responsive to rotation of the valve stem about a first axis;
a gear member coupled to the valve stem; and
a linear positioning member having at least a portion thereof configured to complementarily engage the gear member, wherein the linear positioning member is configured to be displaced along a second axis and cause rotation of the gear member and the valve stem about the first axis upon such displacement of the linear positioning member along the second axis, and wherein the at least a portion of the linear positioning member which is configured to complementarily engage the gear member is configured as a substantially helically cut worm gear.

2. The fluid flow control device of claim 1, wherein the worm gear is formed of a material comprising carbon steel and wherein the gear member is formed of a material comprising brass.

3. The fluid flow control device of claim 1, further comprising a linear positioning actuator coupled with the linear positioning member and configured to displace the linear positioning member along the second axis.

4. The fluid flow control device of claim 3, wherein the linear positioning actuator includes a linear positioning stepper motor.

5. The fluid flow control device of claim 4, wherein the linear positioning actuator is configured to be operably coupled with a controller.

6. The fluid flow control device of claim 5, wherein the linear positioning actuator is configured to receive an electrical input signal in the range of approximately 4 to 20 milliamps.

7. The fluid flow control device of claim 6, wherein the linear positioning actuator includes a direct current power supply.

8. The fluid flow control device of claim 7, wherein the direct current power supply includes a transformer configured to be coupled with an alternate current power supply.

9. The fluid flow control device of claim 3, further comprising a frame member coupling the linear positioning actuator to the valve.

10. The fluid flow control device of claim 3, wherein the linear positioning actuator is configured to limit the travel of the linear positioning member along the second axis within a predetermined range.

11. The fluid flow control device of claim 3, further comprising a linear position sensor located and configured to detect a position of the linear positioning member.

12. The fluid flow control device of claim 11, wherein the linear position sensor includes a linear potentiometer.

13. The fluid flow control device of claim 1, wherein the worm gear is substantially rotationally fixed about the second axis.

14. The fluid flow control device of claim 1, wherein the valve is configured to accommodate a fluid flow at a pressure of up to at least approximately 3,000 pounds per square inch.

15. The fluid flow control device of claim 1, wherein the valve is configured to have a flow coefficient of approximately 0.004 $C_v$.

16. The fluid flow control device of claim 1, wherein the valve is configured to maintain a substantially constant flow rate of fluid flowing therethrough at approximately 1 milliliter per minute or less.

17. The fluid flow control device of claim 1, wherein the valve stem is threadably coupled with the valve.

18. A fluid flow control system comprising:
a controller;
at least one fluid flow control device operably coupled with the controller, the at least one fluid flow control device comprising:
a valve having a fluid inlet, a fluid outlet and a flow path defined therebetween, the valve further including a valve seat in communication with the flow path and a valve stem disposed within the valve seat and cooperatively configured with the valve seat to cause the valve stem to advance or back off within the valve seat responsive to rotation of the valve stem about a first axis;
a gear member coupled to the valve stem; and
a linear positioning member having at least a portion thereof configured to complementarily engage the gear member, wherein the linear positioning member is configured to be displaced along a second axis and cause rotation of the gear member and the valve stem about the first axis upon such displacement of the linear positioning member along the second axis, and wherein the at least a portion of the linear positioning member which is configured to complementarily engage the gear member is configured as a substantially helically cut worm gear.

19. The fluid flow control system of claim 18, further comprising a linear positioning actuator coupled with the liner positioning member and configured to displace the linear positioning member along the second axis, and wherein the controller includes a proportional, integral, derivative (PD) controller in communication with the linear positioning actuator.

20. The fluid flow control system of claim 18, wherein the controller includes a central processing unit and a memory device.

21. The fluid flow control system of claim 18, wherein the controller is operably coupled to at least one input device and at least one output device.

22. The fluid flow control system of claim 18, further comprising at least one sensor operably coupled with the controller, wherein the at least one sensor is located and configured to detect at least one characteristic of a fluid flow associated with the valve.

23. The fluid flow control system of claim 22, wherein the at least one sensor is configured and located to detect at least one characteristic of the fluid flow at a downstream location relative to the valve.

24. The fluid flow control system of claim 22, wherein the at least one sensor is configured and located to detect at least one characteristic of the fluid flow at an upstream location relative to the valve.

25. The fluid flow control system of claim 22, wherein the at least one sensor is located and configured to detect at least one of a pressure, a flow rate and a temperature associated with the fluid flow.

26. The fluid flow control system of claim 18, further comprising a pump configured to provide a fluid flow to the valve.

27. The fluid flow control system of claim 26, wherein the pump is operably coupled with the controller.

28. The fluid flow control system of claim 26, wherein the pump includes a syringe pump.

29. The fluid flow control system of claim 19, wherein the linear positioning actuator includes a linear positioning stepper motor.

30. The fluid flow control system of claim 19, further comprising a frame member coupling the linear positioning actuator to the valve.

31. The fluid flow control system of claim 19, wherein the linear positioning actuator is configured to limit the travel of the linear positioning member along the second axis within a predetermined range.

32. The fluid flow control system of claim 18, further comprising a linear position sensor located and configured to detect a position of the linear positioning member.

33. The fluid flow control system of claim 32, wherein the linear position sensor includes a linear potentiometer.

34. The fluid flow control system of claim 18, wherein the valve is configured to accommodate a fluid flow at a pressure of up to at least approximately 3,000 pounds per square inch.

35. The fluid flow control system of claim 18, wherein the valve is configured to have a flow coefficient ($C_v$) of approximately 0.004 $C^v$.

36. The fluid flow control system of claim 18, wherein the valve is configured to maintain a substantially constant flow rate of fluid flowing therethrough at approximately 1 milliliter per minute or less.

37. The fluid flow control system of claim 18, wherein the worm gear is substantially rotationally fixed about the second axis.

38. The fluid flow control system of claim 18, wherein the valve stem is threadably coupled with the valve.

39. A method of controlling the flow of a fluid, the method comprising:
- providing a valve having an inlet, and outlet, a flow path defined between the inlet and the outlet, and a valve seat in communication with the flow path;
- disposing a valve stem within the valve;
- coupling the valve stem with a gear member;
- engaging the gear member with a complementary surface of a linear positioning member;
- forming the complementary surface of the linear positioning member as a substantially helically cut worm gear;
- flowing the fluid through the flow path; and
- displacing the linear positioning member along a first axis to rotate the gear member and valve stem about a second axis and displacing the valve stem along the second axis.

40. The method according to claim 39, further comprising substantially restraining the worm gear from rotating about the first axis.

41. The method according to claim 39, further comprising sensing at least one characteristic of the fluid.

42. The method according to claim 41, wherein sensing at least one characteristic of the fluid includes sensing at least one of a pressure, a temperature and a flow rate of the fluid.

43. The method according to claim 41, wherein displacing the linear positioning member along a first axis is responsive to the detected at least one characteristic of the fluid.

44. The method according to claim 41, wherein sensing at least one characteristic of the fluid includes sensing the at least one characteristic of the fluid at a location upstream of the valve.

45. The method according to claim 41, wherein sensing at least one characteristic of the fluid includes sensing the at least one characteristic of the fluid at a location downstream of the valve.

46. The method according to claim 39, wherein flowing the fluid through the flow path further includes flowing a compressible fluid through the flow path.

47. The method according to claim 39, wherein flowing the fluid through the flow path includes effecting a phase change within the fluid.

48. The method according to claim 39, wherein flowing the fluid through the flow path further includes flowing the fluid at a substantially constant rate of approximately 1 milliliter per minute or less.

49. The method according to claim 39, further comprising maintaining a pressure of the fluid within approximately 3 pounds per square inch of a predetermined pressure.

50. The method according to claim 39, wherein disposing a valve stem within the valve seat further includes threadably engaging the valve stem with the valve.

* * * * *

UNITED STATES PATENT AND TRADEMARK OFFICE
CERTIFICATE OF CORRECTION

PATENT NO. : 7,287,541 B2 Page 1 of 1
APPLICATION NO. : 10/760015
DATED : October 30, 2007
INVENTOR(S) : Ryan D. McMurtrey, Daniel M. Ginosar and Joseph V. Burch It is certified that error appears in the above-identified patent and that said Letters Patent is hereby corrected as shown below:

On the Title Page Item (75)
Inventor Joesph V. Burch should be corrected to read Joseph V. Burch Signed and Sealed this Tenth Day of June, 2008

JON W. DUDAS
*Director of the United States Patent and Trademark Office*